(12) United States Patent
Bergen

(10) Patent No.: US 7,506,595 B2
(45) Date of Patent: Mar. 24, 2009

(54) AGRICULTURAL FURROWING TOOL

(76) Inventor: Henry J. Bergen, 2002 20th Street, Coaldale, Alberta (CA) T1M 1M5

( * ) Notice: Subject to any disclaimer, the term of this patent is extended or adjusted under 35 U.S.C. 154(b) by 17 days.

(21) Appl. No.: 11/874,181

(22) Filed: Oct. 17, 2007

(65) Prior Publication Data

US 2008/0115707 A1    May 22, 2008

Related U.S. Application Data

(63) Continuation-in-part of application No. 11/467,556, filed on Aug. 27, 2006.

(51) Int. Cl.
*A01B 15/10* (2006.01)
*A01B 23/00* (2006.01)
*A01B 31/00* (2006.01)
*A01B 35/20* (2006.01)
*A01C 5/00* (2006.01)

(52) U.S. Cl. .................. 111/152; 172/724; 172/730; 172/766; 172/770; 172/771

(58) Field of Classification Search .................. 111/152, 111/124; 172/721–733, 765–770
See application file for complete search history.

(56) References Cited

U.S. PATENT DOCUMENTS

| 4,388,878 | A | * | 6/1983 | Demzin | 111/186 |
| 4,393,791 | A | * | 7/1983 | Suderman | 111/195 |
| 4,638,748 | A | * | 1/1987 | Kopecky | 111/124 |
| 4,674,419 | A | * | 6/1987 | Kopecky | 111/73 |

* cited by examiner

*Primary Examiner*—Christopher J. Novosad
(74) *Attorney, Agent, or Firm*—Peter J. Rashid

(57) ABSTRACT

A ground engaging furrowing tool for paired row seeding comprising a body having a forward leading point, a bottom and laterally outwardly extending wing members. Each wing member including a leading edge that flares rearward to a trailing edge to form a generally V-shaped profile bottom surface, the trailing edge of each wing member including a seed outlet only open in a rearward direction.

2 Claims, 2 Drawing Sheets

AGRICULTURAL FURROWING TOOL

CROSS REFERENCE TO RELATED APPLICATION

This application is a continuation-in-part of U.S. patent application Ser. No. 11/467,556, entitled Seed Boot Opener Having Interchangeable Dispensers, filed Aug. 27, 2006, the disclosure of which is hereby incorporated by reference in its entirety.

FIELD OF THE INVENTION

This invention relates generally to implements for planting agricultural crops in the ground and, more particularly, to a point of an agricultural furrowing tool for closed bottom paired row seeding.

BACKGROUND OF THE INVENTION

Planting crops using a power drawn seed boot may entail different requirements depending upon the type of crop being planted, whether the farmer is undertaking single or multiple row planting, soil quality, and other variables. Seed boots must vary in their discharge capabilities accordingly. It would be possible to maintain one seed boot for each variety of planting. However, this increases the burden of a farmer's capital expenditures, and also complicates preparation for each successive planting where different seeding patterns must be practiced. The complication is that for each planting, a different seed boot may be required.

An example of a seed boot is shown in U.S. Pat. No. 6,745,705, incorporated herein by reference.

Ideally, seeds are spaced evenly over an entire field. However, for practical purposes, seeds are planted in rows by ground working tools. The rows are spaced to achieve the best possible utilization of the soil area. Other factors affect row spacing, such as the need to allow field trash from prior years growth to pass between ground working tools while also arranging the ground working tools in a pattern which produces a smooth field surface. This has led to development of ground working tools which plant two rows of seed or a wide band of seed to achieve good seedbed utilization with fewer number of ground working tools and greater space between these tools thus allowing good trash flow. It is also common that these tools are designed to simultaneously place a row of fertilizer beside and below the seeds, or between the rows of seeds, thereby eliminating a need for fertilizing in a second pass and placing the fertilizer more accurately than is achievable in a separate pass.

One type of planting tool is known to have a standard sweep in a leading position for forming a furrow having a level or flat seedbed on which a pair of seed rows are placed, one to each side of the seedbed. The furrow is closed by soil passing over wings extending to the sides of the sweep. The tool further includes a second furrowing element comprising a rearwards angled blade for forming a second, deeper furrow between the rows of seed from 1 inch to 2.5 inches deep. A fertilizer dispensing tube is secured to the blade and also angles rearwards with the blade to dispense fertilizer into the second furrow It will be appreciated that further improvements in the known prior art designs are desired. .

SUMMARY OF THE INVENTION

It is an object of this invention to overcome the aforementioned disadvantages of the prior art by providing an improved point of an agricultural furrowing tool for closed bottom paired row seeding These and other objects, features and advantages are accomplished according to the instant invention by providing a ground engaging furrowing tool for paired row seeding comprising a body having a forward leading point, a bottom and laterally outwardly extending wing members. Each wing member including a leading edge that flares rearward to a trailing edge to form a generally V-shaped profile bottom surface, the trailing edge of each wing member including a seed outlet only open in a rearward direction.

BRIEF DESCRIPTION OF DRAWINGS

The advantages of this invention will be apparent upon consideration of the following detailed disclosure of the invention, especially when taken in conjunction with the accompanying drawings wherein.

DETAILED DESCRIPTION OF PREFERRED EMBODIMENTS

Figure 1:
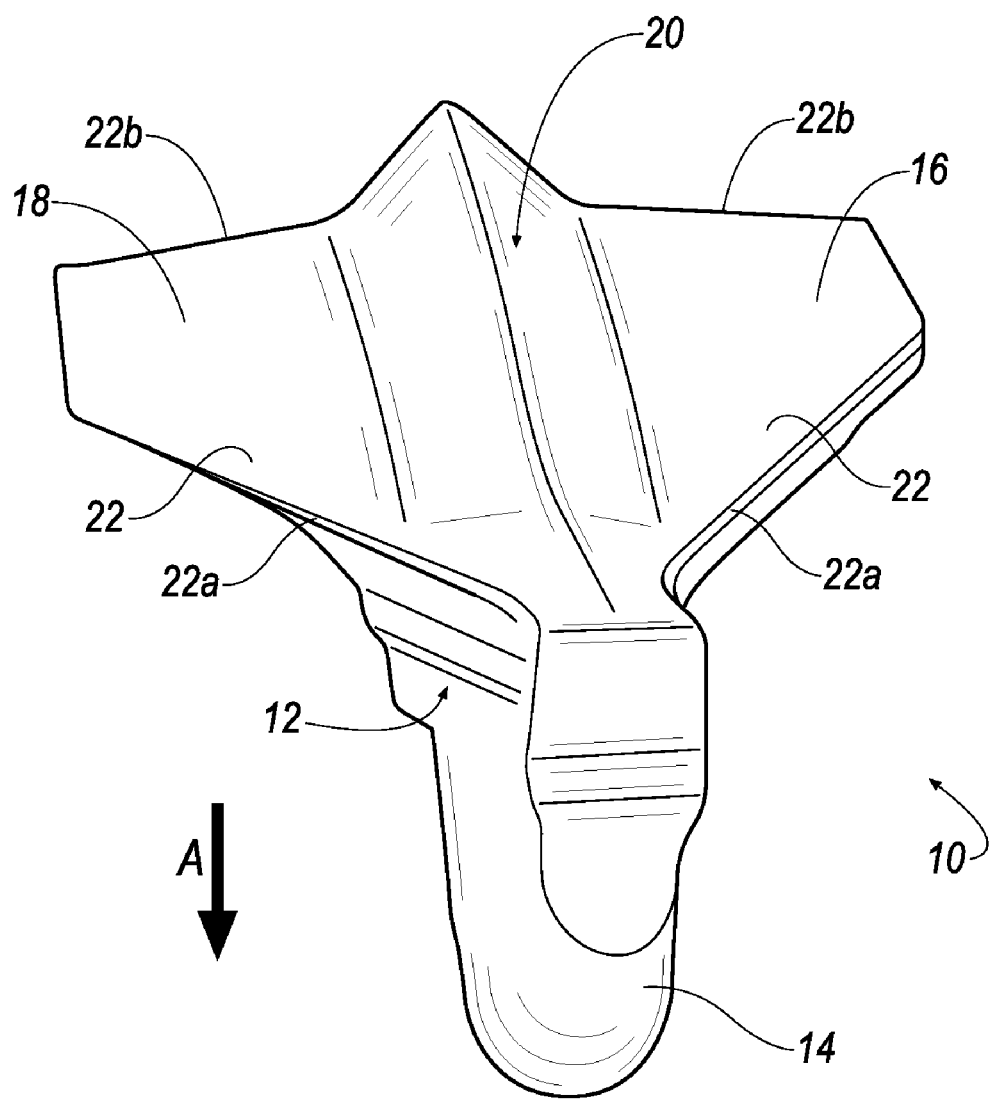
FIG. 1 is a bottom perspective forward view of a furrowing tool for paired row seeding incorporating the principles of the instant invention.
Figure 2:
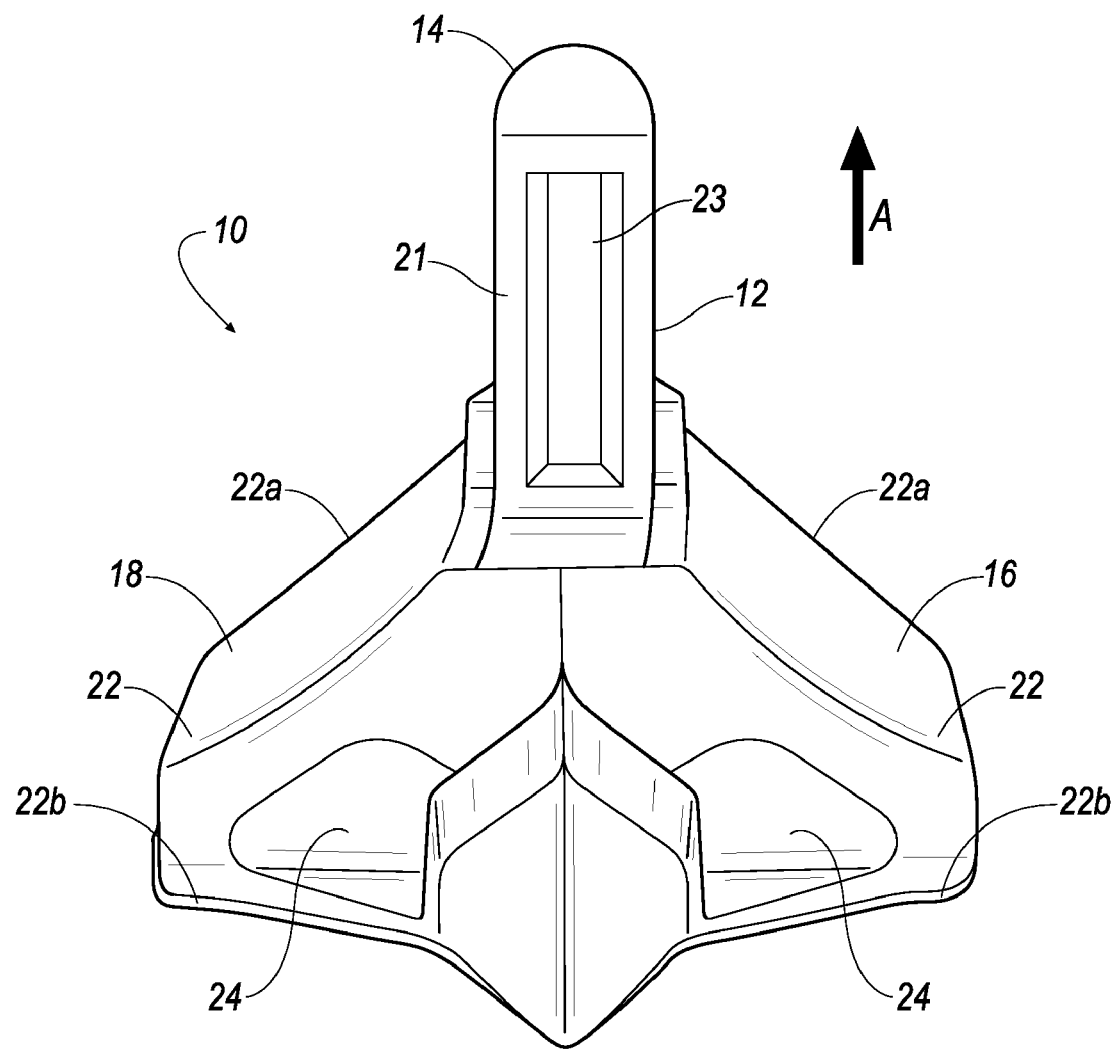
FIG. 2 is a top perspective rearward view of the furrowing tool shown in FIG. 1.

FIG. 1 of the drawings shows a ground engaging furrowing tool 10 of a seed boot (not shown). In a preferred embodiment, the ground engaging tool 10 is a bottom point paired row seeder configuration for discharging fluent materials such as seed and other substances into the ground.

The ground engaging furrowing tool 10 comprises a body 12 having a forward leading point 14, a right side 16 and a left side 18. Right side 16 and left side 18 are respectively the right and left surfaces of the body 12 with respect to the forward direction indicated as arrow A. The body 12 includes a mounting portion that extends upwardly and is adapted for securing the body to the seed boot. The forward leading point 14 is the forward most part of seed boot when being drawn by a tractor or the like (not shown) in actual use.

The body 12 includes a bottom 20, a top 21 and laterally outwardly extending wing members 22. Each wing member 22 includes a leading edge 22a that flares rearward to a trailing edge 22b such that the bottom has a generally continuous V-shaped profile. A seed inlet 23 is formed in the top 21 of the body 12 proximate the forward leading point 14, and a seed outlet 24 is formed within each wing member 22 proximate the trailing edge 22b. A seed dispensing passage extends from the seed inlet 23 to the pair of spaced apart seed outlets 24 within each wing member 22 such that material dispensed from the seed inlet 23 travels downwardly and rearwardly to the seed outlet 24.

In an operating orientation, material such as a seed stream entering the seed inlet moves downward and rearward to the paired seed outlets 24 to exit from the trailing edge 22b of each wing member 22 with a rearward velocity and direction.

The seed outlets 24 are formed in the trailing edge 22b of each wing member 22 and only open in rearward direction. Conventional ground entering points of seed boots include seed outlets that open downward. It will be appreciated that a rearward opening seed outlet 24 in accordance with the present invention will not plug with soil, trash and the like during use.

The seedbed furrowing tool is securable to the main tool body by a fastener as well known in the art.

The component typically operates with the leading edge 22a from 0.5 inches to 4 inches below the surface of the ground. Ground is cut by the leading edge 22a and V-shaped bottom to form a seedbed and the cut soil flows up over the wings 22. The ground surface is penetrated by the upper narrow portion of the component which slices through the ground with minimal disturbance. Ground that had been displaced by the seedbed furrowing tool begins to flow back over the seedbed after the rear end passes by.

It will be appreciated that the furrowing tool 10 may be made of an assembly of modular components including a furrowing tool and a fertilizer furrowing component as well known in the art. In addition, material delivery passages have been described above for seed, but it is understood that other combinations of materials can be planted into the ground with a tool of this design such as fertilizer, dispensing pesticide or herbicide in place of the fertilizer stream or alternating seed and fertilizer streams, although the best known mode of operation is with planting paired seed rows.

While the invention has been specifically described in connection with certain specific embodiments thereof, it is to be understood that this is by way of illustration and not of limitation, and the scope of the appended claims should be construed as broadly as the prior art will permit.

What is claimed is:

1. An agricultural furrowing tool, comprising:
a body of unitary construction having a forward leading point, a bottom, a top and laterally outwardly extending wing members, each wing member including a leading edge that flares rearward to a trailing edge such that the bottom has a generally continuous V-shaped profile, the body further including a single seed inlet formed in the top of the body proximate the forward leading point and a pair of seed outlets formed in the top of the body, one of the seed outlets formed within one wing member proximate the trailing edge and the other one of the seed outlets formed within the other wing member proximate the trailing edge, the seed inlet located between the seed outlets such that material dispensed from the seed inlet travels downwardly and rearwardly to the seed outlets.

2. An agricultural furrowing tool, comprising:
a body of unitary construction having a forward leading point with respect to a direction of travel of the body, a bottom, a top and laterally outwardly extending wing members, each wing member including a leading edge that flares rearward to a trailing edge such that the bottom has a generally continuous V-shaped profile, the body further including a seed inlet formed in the top of the body proximate the forward leading point and a seed outlet formed in the top of the body within each wing member proximate the trailing edge such that material dispensed from the seed inlet travels downwardly and rearwardly to the seed outlet such that the material exits the body in an opposite direction with respect to the direction of travel of the body.

* * * * *